Figure 1:
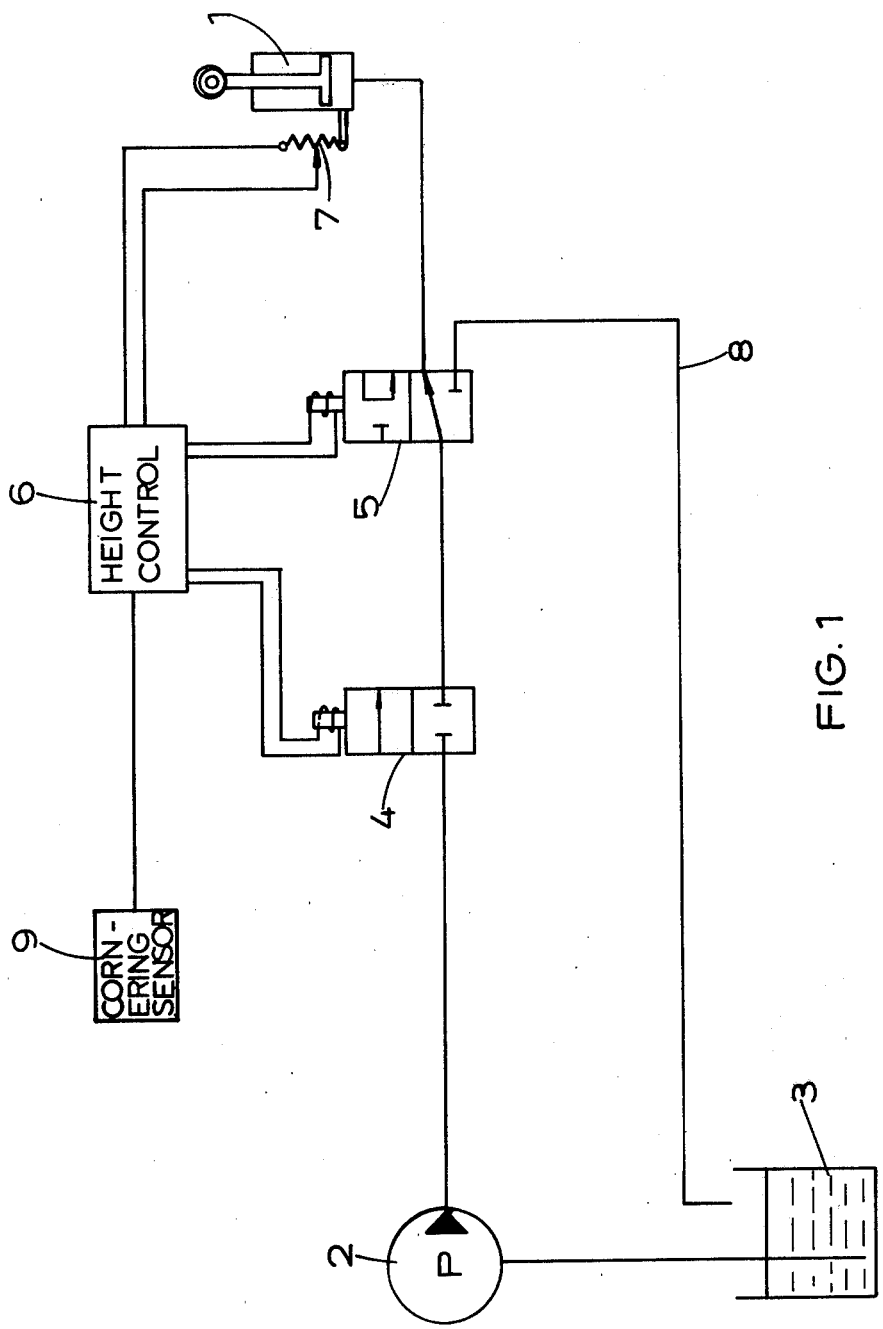

United States Patent [19]
Harris

[11] 4,361,346
[45] Nov. 30, 1982

[54] SUSPENSION SYSTEMS FOR VEHICLES

[75] Inventor: Alan L. Harris, Coventry, England

[73] Assignee: Lucas Industries Limited, Birmingham, England

[21] Appl. No.: 228,586

[22] Filed: Jan. 26, 1981

[30] Foreign Application Priority Data

Jan. 26, 1980 [GB] United Kingdom ............. 8002697

[51] Int. Cl.³ ............................................. B60G 11/28
[52] U.S. Cl. ................................. 280/707; 280/709; 280/DIG. 1; 267/64.16
[58] Field of Search ............ 280/707, 708, 709, 714, 280/104, 6 H, 6.1, 702, 772, DIG. 1; 267/64.16

[56] References Cited

U.S. PATENT DOCUMENTS

| | | | |
|---|---|---|---|
| 3,895,820 | 7/1975 | Takahashi | 280/709 |
| 3,910,594 | 10/1975 | Joneleit | 280/709 |
| 3,992,039 | 11/1976 | Miruma | 280/703 |
| 4,076,275 | 2/1978 | Hiruma | 280/707 |
| 4,185,845 | 1/1980 | Misch | 280/6 H |

Primary Examiner—Robert R. Song
Attorney, Agent, or Firm—Scrivener, Clarke, Scrivener and Johnson

[57] ABSTRACT

In a suspension system which is designed to maintain a nominal ride height between the body and the unsprung parts of a vehicle, the difference in wheel speed on opposite sides of the vehicle produced during cornering is used to inhibit adjustment of ride height.

An electrical sensor and control unit is used to control flow of hydraulic fluid to and from a suspension unit by means of solenoid-operated valves, so as to maintain the ride height constant. A cornering sensor compares the sensed speeds of two wheels, preferably mounted on a common axle, and inhibits the control unit when the difference in speeds departs from an expected difference by more than a certain amount. The expected difference may be zero or it may be the average difference derived over a period of time.

8 Claims, 2 Drawing Figures

SUSPENSION SYSTEMS FOR VEHICLES

SPECIFIC DESCRIPTION

This invention relates to suspension systems for vehicles, particularly those which are designed to maintain a suitable height relationship between the sprung and unsprung parts of the vehicle despite changes in vehicle load.

In this context, "the sprung parts of the vehicle" means the body and its associated components, and "the unsprung parts of the vehicle" means those parts of the vehicle (including the wheels, axles and the drive mechanism for the wheels) from which the body is supported by springs or equivalent members.

Such suspension systems must include some sort of delay to ensure that adjustment of the height relationship between the sprung and unsprung parts (the nominal ride height) can occur only in response to genuine alterations in vehicle load, and not in response to oscillatory motion of the springs. Methods of achieving this aim include incorporating a delay into an electrical control system and damping the movement of a control valve.

It is also necessary to minimise any response due to lateral (roll-generating) forces produced whilst cornering. The effects of any such response will be apparent from a consideration of a vehicle driving through an 'S' bend. If the suspension system were allowed to compensate for the roll generated whilst cornering by bringing the vehicle back towards the level condition during the first part of the bend, the second part would be approached in a "pre-rolled" condition. This is clearly a very dangerous situation, and the condition would not be corrected rapidly because of the in-built delay referred to above. Furthermore, even when the delay has been exceeded, the rate of adjustment is often quite slow, frequently being limited by the capacity of a pump used in the height adjustment system.

It has been suggested that the problem can be overcome by selecting the delay so as to ensure that cornering would be completed before the system starts to respond. This is impractical because of the conflict between the delay needed to prevent roll correction, and the need to ensure reasonably rapid attitude correction from start up in a fully laden condition. It is quite possible to maintain a cornering manoeuvre for 20-30 seconds on some of the large radius curves which are found at motorway intersections for example.

A more practical way of overcoming the problem has been proposed, which involves interposing a pendulum-operated spool valve in the fluid lines to and from struts used to adjust the nominal ride height of the vehicle. When the pendulum is substantially vertical, fluid can be fed to and from the struts via the spool valve so that the suspension system operates in the normal way. But during a cornering manoeuvre the pendulum swings to one side or the other and operates the valve to isolate the struts, so preventing height adjustment from taking place.

This arrangement still has drawbacks when the vehicle is running on a cambered road, because the pendulum may move out of vertical when the vehicle is travelling along a straight stretch of road, thus inhibiting the necessary corrections. Furthermore, the pendulum-operated valve adds considerably to the cost of the system.

According to the present invention, a suspension system for a vehicle comprises at least two suspension units installed on opposite sides of the vehicle and adapted to maintain a suitable height relationship between the sprung and unsprung parts of the vehicle depite changes in vehicle load, respective sensors for sensing the speed of rotation of each of two wheels on opposite sides of the vehicle, means for comparing the sensed speeds of the two wheels and producing an inhibit command when the instantaneous difference between the sensed speeds departs by more than a certain amount from an expected difference, and means to prevent the suspension units from being adjusted in response to the inhibit command.

Thus, in essence, the different variations in rotational speed between two wheels on opposite sides of the vehicle which occurs during a cornering manoeuvre is used to inhibit adjustment of the nominal ride height of the vehicle. On first sight it might be thought that this would be an unreliable way of detecting cornering, due to other factors which inevitably effect wheel speed during cornering, such as tyre deflection. But in fact tyre deflection helps to accentuate the difference in wheel speed during cornering.

Although it is possible to use a mechanical differential gear system to sense the wheel speeds and inhibit ride height adjustment in the specified manner, it is preferable if the speed comparison means operates to produce an inhibit command in the form of an electrical inhibit signal which is used to prevent the suspension units from being adjusted by inhibiting an electrical height control circuit. The use of an electrical control circuit is cheaper and generally more reliable than a purely mechanical system.

In the simplest case it might be assumed that there will be no difference in the sensed speeds when the vehicle is being driven along a straight stretch of road. In other words the expected difference would be zero. However, a more refined system could include means to produce an electrical expected difference signal corresponding to the expected difference in sensed speed between the wheels by deriving on average value for any difference between the sensed speeds. The expected difference signal would be fed to the comparison means as a reference signal for use in producing the inhibit signal. Such an arrangement would be of advantage when the tyres of the two monitored wheels were worn to different degrees thus providing different rolling radii, or when the tyres have different tread characteristics.

The system preferably includes means to vary the amount by which the instantaneous speed difference must depart from the expected difference to produce the inhibit signal, in accordance with the speed of the vehicle. Thus, for example, on a bend of a specified radius the system may operate to prevent adjustment of ride hight at high speeds but permit adjustments to be made at lower speeds.

Some vehicles are now being fitted with both a so-called self-levelling suspension and an anti-wheel-lock braking system which includes means for sensing the rotational speed of the wheels. Considerable savings in cost, space, and weight could be achieved by integrating the two systems, at least in part, so that they share common wheel speed sensing means. A particular advantage of integrating these systems is that during heavy braking when wheel slip is most likely to occur the wheels will tend to rotate at different speeds simulating a cornering manoeuvre and thus inhibiting adjustment of the nominal ride height. This may substantially improve the stability of the vehicle under such conditions. When both systems are controlled electrically it may also be advantageous to integrate the two control modules into one common module.

The wheels of which the speeds of rotation are sensed preferably share a common axle.

Figure 2:
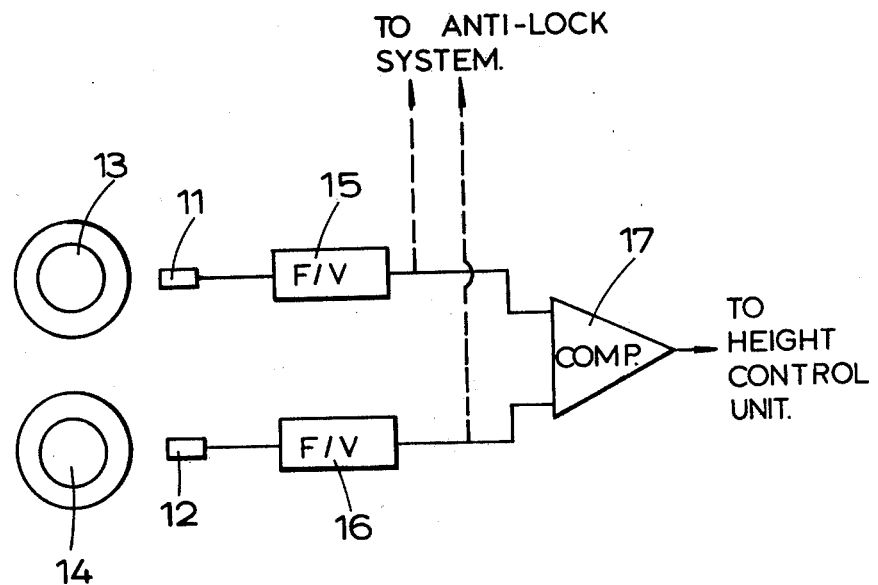

The invention will now be further described, by way of example only, with reference to the accompanying drawings, of which:

FIG. 1 is a layout of the suspension system of a vehicle, according to the invention, and FIG. 2 is a block circuit diagram of the cornering sensor shown in FIG. 1.

For simplicity only a single suspension unit 1 and its associated control system is shown in FIG. 1, but in a practical installation the body will be supported from each wheel of the vehicle, or at least from each wheel of one axle, by means of a similar suspension unit.

The suspension units may be of the ram type in which each unit is effective to adjust the mounting position of the associated suspension spring within the body. Alternatively each unit may comprise an integral gas spring and damper unit, as disclosed in British Patent Specification 857,799 for example.

A high pressure hydraulic pump 2 is arranged to draw fluid from a reservoir 3 and pump it to the suspension unit 1 through first and second solenoid-operated valves 4 and 5. Both valves are operated in response to electrical signals from an electronic height control unit 6 which receives signals from an electrical ride height sensor 7. The sensor 7 is associated with the suspension unit 1 in such a way that it monitors the height between the sprung and unsprung parts of the vehicle in the vicinity of the suspension unit.

The pump 2 is under the control of the control unit 6 so that the pump only operates when fluid is required by the suspension unit 1. Alternatively, the pump could be provided with means to reduce the load on the pump when fluid is not required.

At a certain ride height, the valves 4 and 5 are in the positions shown in the drawing, that is, the second valve 5 connects the suspension unit 1 to the first valve 4, but the first valve 4 is closed. Thus, fluid is trapped in the suspension unit so that the nominal ride height of the vehicle remains constant. In order to increase the nominal ride height, the first valve 4 is moved to its alternative position so that fluid can be pumped from the reservoir 3, via valves 4 and 5, into the lower chamber of the suspension unit, thus increasing its length. When the required nominal ride height has been reached, as detected by the sensor 7, the first valve 4 is moved back to its closed position shown. In order to reduce the nominal ride height, the second valve 5 is moved to its alternative position in which the suspension unit 1 is connected to the reservoir through a return line 8, thus enabling fluid to be dumped from the suspension unit to reduce its length. When the required height relationship has been achieved the second valve 5 is returned to its initial position.

A cornering sensor 9 is connected to the height control unit 6 so that, whilst the vehicle is cornering, both valves 4 and 5 can be maintained in the positions shown, irrespective of any signals from the height sensor 7, thus preventing any adjustment of ride height in response to lateral forces produced whilst cornering. The cornering sensor is described in more detail below with reference to FIG. 2.

The cornering sensor 9 comprises a pair of wheel speed sensors 11, 12, associated with a pair of wheels 13, 14, mounted on opposite ends of a common axle of the vehicle. Each sensor produces an output signal having a frequency which is proportional to the speed of rotation of the respective wheel 13, 14. The signal from each sensor is fed to a respective frequency/voltage converter 15, 16, which produces a voltage proportional to the frequency of the signal from the associated sensor. Thus, the magnitude of the voltage produced by each converter 15, 16, is proportional to the speed of the associated wheel. These output voltages are fed to a comparator 17 which produces an inhibit signal when one voltage differs from the other by more than a predetermined amount, indicating that the wheels are rotating at different speeds. The inhibit signal is used to inhibit the height control unit 6 as described above. (In this case the "expected difference" between the two speeds is zero.)

A single cornering sensor may be used to inhibit adjustment of all the suspension units of a vehicle. Similarly, the pump 2 and reservoir 3 will usually be shared by all the suspension units for reasons of economy.

The outputs of the frequency/voltage converters 15 and 16 are fed to an anti-wheel-lock system, as indicated by the broken lines in FIG. 2. The advantages of integrating the ride height control system with an anti-lock system have already been explained above.

The cornering sensor described above employs a fairly simple circuit, but more sophisticated circuitry may of course be used.

In one modification, the cornering sensor includes circuitry for deriving a continuous average wheel speed difference and the system is arranged so that height adjustment is inhibited only when the instantaneous wheel speed difference departs from the average value by more than a certain amount. In this case the "expected difference" referred to above is the average wheel speed difference over a period of time. This allows automatic compensation for any inherent difference between the rotational speeds of the monitored wheels.

The circuit may also be modified to vary the amount by which the instantaneous wheel speed difference must depart from the expected difference to produce inhibition, in accordance with the speed of the vehicle (which may be taken from one or both speed sensors).

Digital techniques may be used to analyse the signals produced by the two wheel speed sensors 11 and 12, and minimise the risk of spurious responses.

I claim:

1. In a vehicle having sprung and unsprung parts, a suspension system comprising at least two suspension units installed on opposite sides of the vehicle and adapted to maintain a suitable height relationship between the sprung and unsprung parts of the vehicle despite changes in vehicle load, respective sensors for sensing the speed of rotation of each of two wheels on opposite sides of the vehicle, means for comparing the sensed speeds of said two wheels and producing an inhibit command when the instantaneous difference between said sensed speeds departs by more than a certain amount from an expected difference, and means to prevent said suspension units from being adjusted in response to said inhibit command.

2. A suspension system according to claim 1, including an electrical height control circuit arranged to control said suspension units so as to maintain said height relationship between said sprung and unsprung parts, and in which the aforementioned speed comparison means operates to produce said inhibit command in the form of an electrical inhibit signal which is used to inhibit said height control circuit.

3. A suspension system according to claim 2, including respective height sensing means, associated with each of said suspension units, for sensing the height between the sprung and unsprung parts of the vehicle and producing electrical height signals which vary in accordance therewith, said height signals being fed to said height control circuit; and including respective cut-off means associated with each respective suspension unit for controlling flow of liquid thereto and therefrom under the control of said height control circuit in order to maintain said height relationship between the sprung and unsprung parts of the vehicle.

4. A suspension system according to claim 3, in which said cut-off means comprise solenoid-operated valves.

5. A suspension system according to claim 2, 3 or 4, which includes means to produce an electrical expected difference signal corresponding to said expected difference in sensed speed between said wheels by deriving an average value for any difference between said sensed speeds, said expected difference signal being fed to the aforementioned speed comparison means.

6. A suspension system according to claim 2, which includes means to vary the amount by which said instantaneous speed difference must depart from said expected difference to produce said inhibit signal, in accordance with the speed of the vehicle.

7. A suspension system according to claim 2, in which said speed sensors are connected to an anti-wheel-lock braking system.

8. A suspension system according to claim 1, in which said wheels of which the speeds of rotation are sensed share a common axle.

* * * * *